(12) United States Patent
Thomas

(10) Patent No.: US 6,501,866 B2
(45) Date of Patent: Dec. 31, 2002

(54) METHOD AND APPARATUS FOR CROSS-CONNECTING OPTICAL TRANSMISSION SIGNALS

(75) Inventor: Mark Thomas, Fremont, CA (US)

(73) Assignee: Mahi Networks. Inc., Petaluma, CA (US)

( * ) Notice: Subject to any disclaimer, the term of this patent is extended or adjusted under 35 U.S.C. 154(b) by 0 days.

(21) Appl. No.: 09/792,963

(22) Filed: Feb. 23, 2001

(65) Prior Publication Data

US 2001/0053015 A1 Dec. 20, 2001

Related U.S. Application Data

(60) Provisional application No. 60/184,923, filed on Feb. 25, 2000.

(51) Int. Cl.⁷ .............................. G02F 1/01; H04B 10/04
(52) U.S. Cl. .................... 385/1; 385/2; 385/14; 385/15; 385/24; 359/115; 359/124; 359/180; 359/181
(58) Field of Search .............................. 385/1, 2, 3, 14, 385/15, 49, 92, 94, 24; 359/115, 124, 152, 154, 180, 181, 188, 189

(56) References Cited

U.S. PATENT DOCUMENTS 5,894,362 A * 4/1999 Onaka et al. ............... 359/124
6,233,075 B1 * 5/2001 Chang et al. ............... 359/124
6,301,037 B1 * 10/2001 Fischer et al. .............. 359/180
6,301,402 B1 * 10/2001 Bhalla et al. ................. 385/16

* cited by examiner

Primary Examiner—Brian Healey
(74) Attorney, Agent, or Firm—Blakely, Sokoloff, Taylor & Zafman, LLP.

(57) ABSTRACT

Method and apparatus are contemplated for electrical-to-optical conversion coupled to an electrical switching fabric, wherein the number of lasers supplying optical carrier beams in electrical-to-optical conversion is less than the number of optical modulators. Cost savings for a reduced number of lasers may be considerable. Further, the shared laser bank supplying optical carrier beams may comprise shared control and monitoring electronics, resulting in a further cost savings. The shared laser bank may comprise at least one redundant laser. Optical modulators may be grouped into modules for ease of replacement and further cost savings. Optical signal conditioning may be applied to the lasers, and the conditioned beams may be shared among the modulators. Soliton pulses may be generated at a desired data rate, distributed to form a plurality of distributed pulse trains, and each pulse stream may be modulated with information from the same or different information channels.

37 Claims, 12 Drawing Sheets

# METHOD AND APPARATUS FOR CROSS-CONNECTING OPTICAL TRANSMISSION SIGNALS

This U.S. Patent application claims the benefit of U.S. Provisional Application No. 60/184,923, filed Feb. 25, 2000.

FIELD

The field of interest is optical networks, and more specifically, optical switching fabrics.

BACKGROUND

An optical switching cross-connect comprises equipment that switches or routes information received from one or more fiber optic media input lines, and transmits the information out through one or more fiber optic media output lines. The connecting of input lines to output lines through the optical cross-connect can occur in any combination or permutation.

FIG. 1 shows a general optical cross-connect 100 with an electrical switching fabric. In this prior art embodiment, each incoming line 102 is fed into the demultiplexer section 104 wherein a demultiplexer 106 separates the multiple wavelengths on each incoming line. In a central portion 108 optical-to-electrical translation of incoming optical signals is accomplished, followed by the switching, which is accomplished electrically. The electrical switching fabric output is then converted via electrical-to-optical translation to optical signals. Finally, each multiplexer 112 in the multiplexer section 110 places several wavelengths onto an output optical transmission line 114.

FIG. 2 (prior art) shows a conventional electrical-to-optical (EO) conversion 200. Each input line 202, typically carrying an optical signal comprising information on a single wavelength carrier, is connected to an optical receiver 204, which translates the optical signals received on the input line into electrical signals. An electrical switching fabric 206 routes each electrical signal to its intended output line 208. The electrical signal output from the electrical switching fabric 206 is then fed to an optical transmitter 210, where the electrical signal modulates an optical laser carrier beam generated by a laser within the optical transmitter. The output of the optical transmitter 210 is fed into an optical transmission line 212, which is typically a fiber optic cable.

FIG. 3 (prior art) shows a typical optical laser transmitter module 300, the module comprising a Continuous Wave (CW) fixed International Telecommunications Union (ITU) grid wavelength laser 302, and an external modulator 304 that modulates the laser carrier beam with information from an Electrical Data Input 306, which data has come from the electrical switching fabric 206 (see FIG. 2). A tap 312 diverts some of the light energy emitted from the laser to a wavelength locker 314, which provides feedback to control circuitry 316 that serves to maintain a specific wavelength of the ITU grid wavelength laser 302. Monitoring circuitry 318 monitors the wavelength and power of the ITU grid wavelength laser 302.

As seen in FIG. 2, prior art EO conversion employs one optical transmitter 210 for each output line coming from the electrical switching fabric 206. Prior art further depicted in FIG. 3 shows that each optical transmitter contains at least one laser that supplies the optical carrier to be modulated by the external modulator 304, which is then output to an Optical Data Output 310.

Optical cross-connect architecture comprises both optical and electrical fabrics. Electrical switching fabrics require optical-to-electrical (OE) conversion circuitry and electrical-to-optical (EO) conversion circuitry. In designing electrical switching fabrics, EO conversion circuitry is the predominant cost factor. Reducing costs of EO conversion circuitry would have a major impact on overall cost of an electrical switching fabric-based optical cross-connect installation. The set of lasers providing output carrier beams to the output modulators is a major expenditure in EO conversion. A reduction in the total number of lasers needed to produce all output channels would result in a significant cost saving.

SUMMARY

Method and apparatus is provided for supplying output carrier optical signals to output modulators through the use of a reduced number of lasers that comprise a shared laser bank. The total number of lasers employed is less than the total number of optical modulators being supplied with optical carriers.

DETAILED DESCRIPTION

Figure 1:
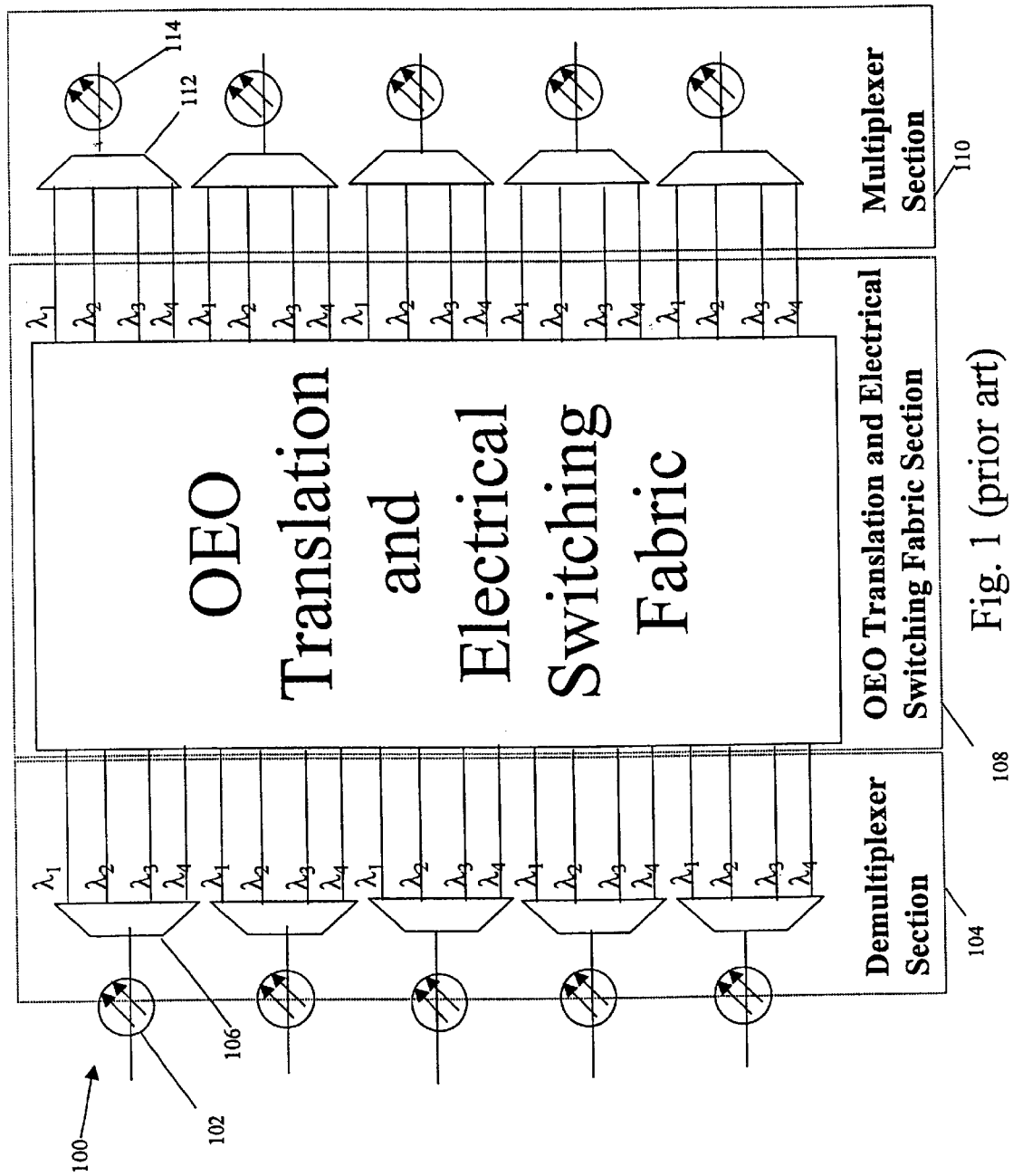
FIG. 1 shows a general optical cross-connect with an electrical switching fabric, as in the prior art.
Figure 2:
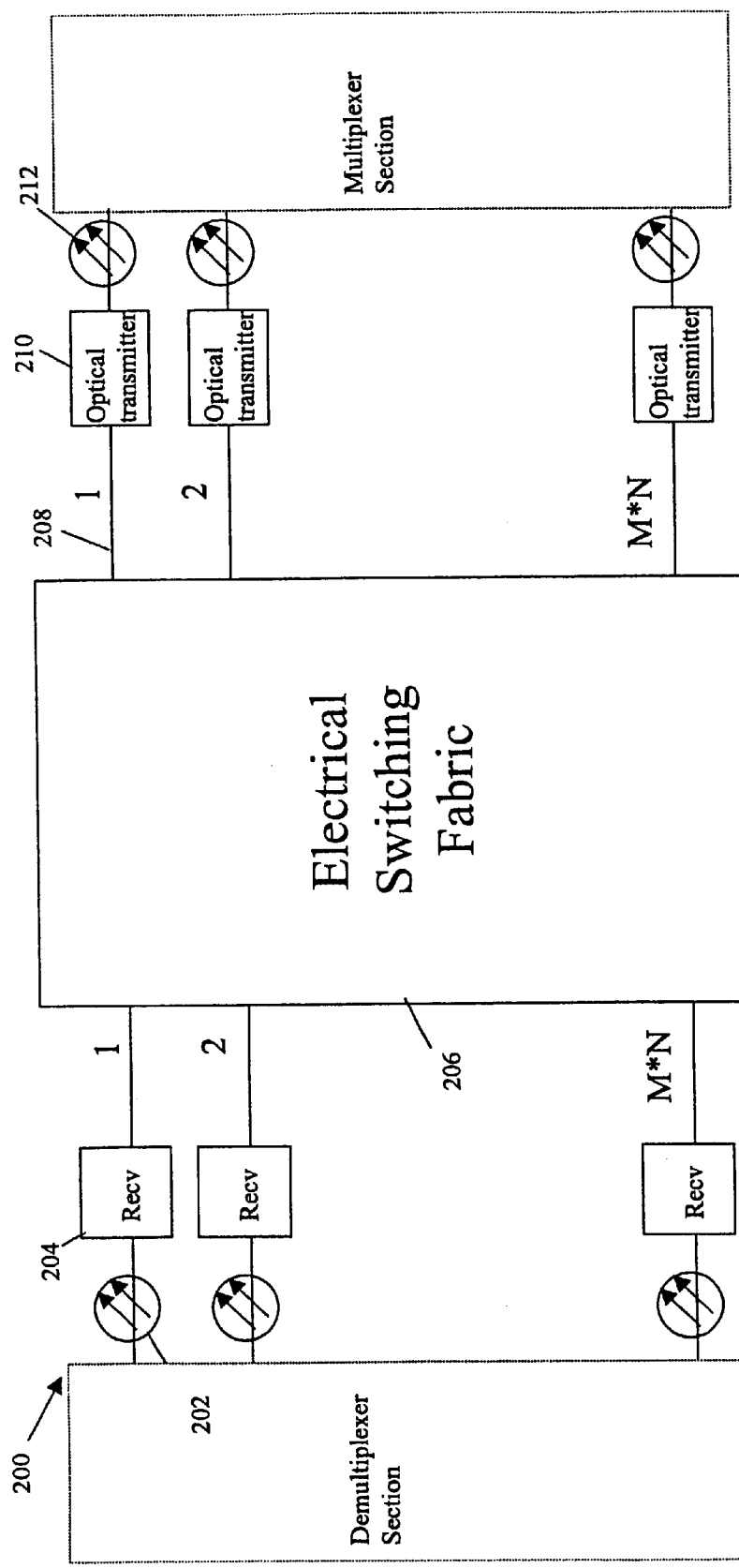
FIG. 2 shows a conventional OE and EO conversion apparatus for an electrical switching fabric, as in the prior art.
Figure 3:
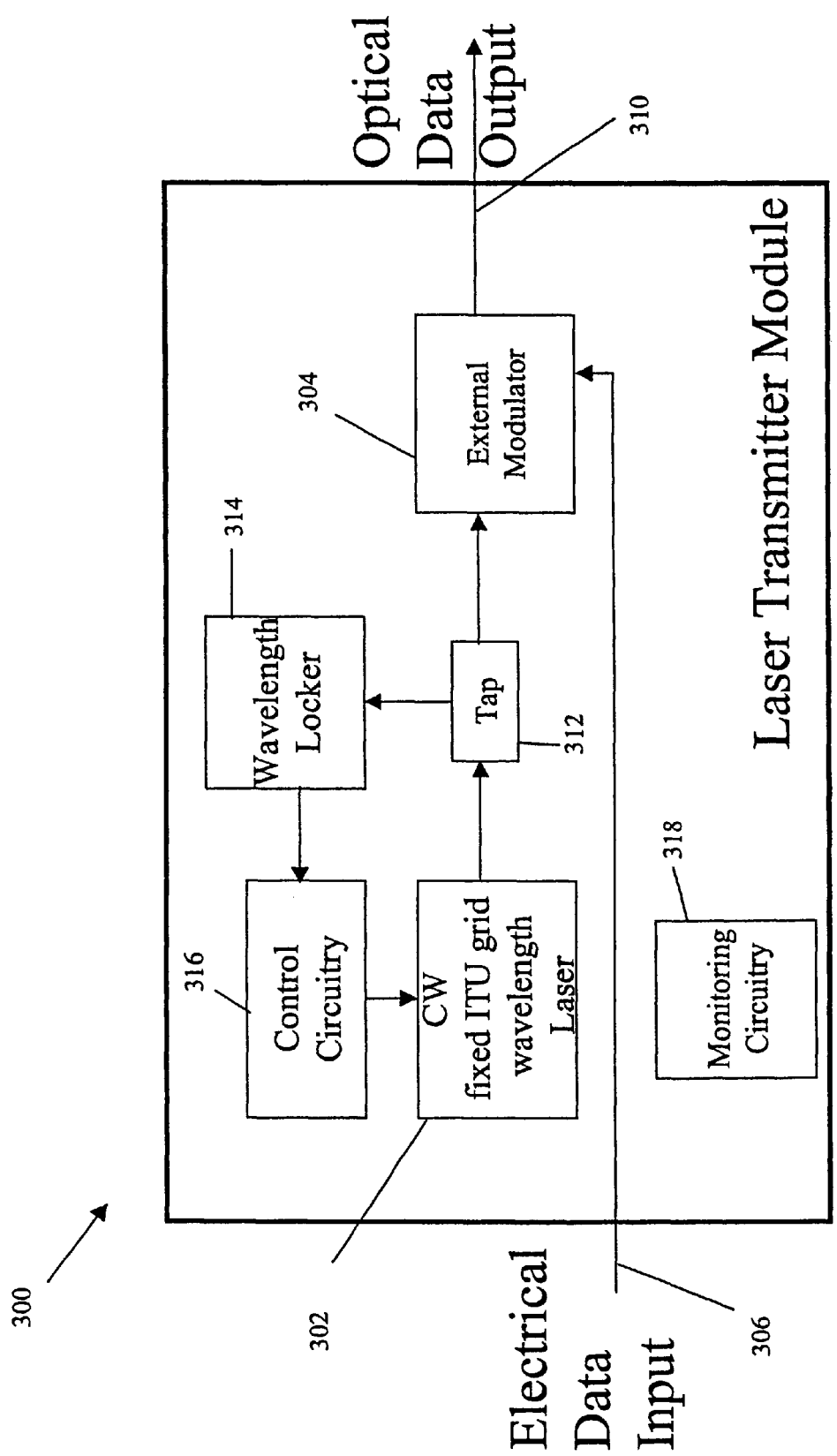
FIG. 3 shows a diagram of a laser transmitter module, also called an optical transmitter, as in the prior art.
Figure 4:
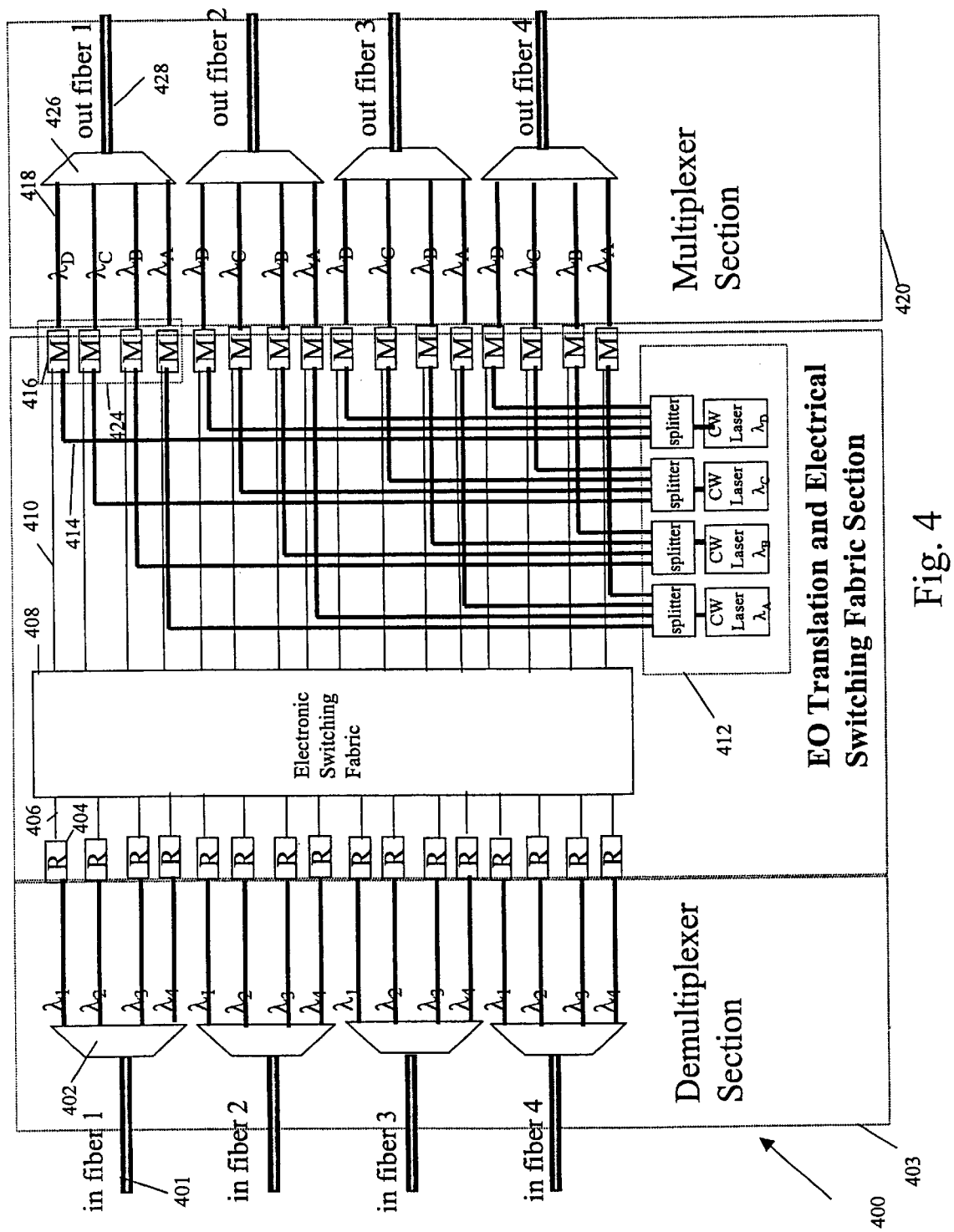
FIG. 4 shows an EO conversion apparatus for an electrical switching fabric, according to an embodiment of the present invention.

An embodiment 400 of the present invention, shown in FIG. 4, has a set of M input optical transmission lines 401, which are typically fiber optic cables. An optical carrier beam comprising N modulated wavelengths (in FIG. 4, N=4) is demultiplexed by a demultiplexer 402 in the demultiplexer section 403, and each of the signals, whose carrier wavelengths are respectfully $\lambda_1$ $\lambda_2$, $\lambda_3$, $\lambda_4$, is fed to an optical receiver 404, which converts the modulated wavelength into a electrical signal. For M transmission lines, each of which carries N modulated wavelengths, a total of M*N signals is fed into an electrical switching fabric 408. If there is a different number of modulated wavelengths $N_i$ for each input optical carrier beam 401 (carrier beams are indexed i=1,2,3, . . . ), then the total number of signals fed into the electrical switching fabric 408 is $\Sigma N_i$, i=1,M. The electrical signals are fed via input lines 406 into the electrical switching fabric 408, which routes the electrical signals to electrical output lines 410, the routing being determined by the configuration of the electrical switching fabric 408. Each output electrical signal is then fed, via an electrical output line 410, into an optical modulator 416. Each optical modulator 416 modulates a laser carrier beam carried on an optical transmission line 414, with an electrical signal supplied by output line 410; alternatively another information channel source (not shown) may be used to modulate an optical modulator. Some of the information channels feeding optical modulators may be redundant, i.e., there may be a plurality of identical output electrical signals that produce identically modulated output optical signals, which may serve to increase the probability of correctly transmitting the data to its final destination and/or be used for a broadcast application wherein identical information is sent to many destinations.

A shared laser bank 412 comprises a set of lasers of wavelengths $\lambda_A$, $\lambda_B$, $\lambda_C$, $\lambda_D$, the laser outputs of which are a set of carrier beams that are routed via optical transmission lines 414, comprising e.g., fiber optic cables, to the optical modulators 416. There are more optical transmission lines 414 than lasers in the shared laser bank 412; hence a small number of lasers supplies carrier beams to a larger number of optical modulators 416. The output of each optical modulator 416 is a modulated optical beam. The modulated optical beams are then fed into output optical transmission lines 418, typically comprising fiber optic transmission cables, and then to the multiplexer section 420. A sub-group of modulators 424 feeds modulated signals to a multiplexer 426, each modulated signal having a different carrier wavelength $\lambda_i$, where i=A, B, . . . . The carrier wavelengths $\lambda_A$, $\lambda_B$, . . . of the output signals to the multiplexer may be the same as or different than the wavelengths of the input signals $\lambda_1$ $\lambda_2$, . . . carried by input lines 401. The multiplexed signal is then transmitted out through an output line 428, typically comprising fiber optic cable.

Figure 5:
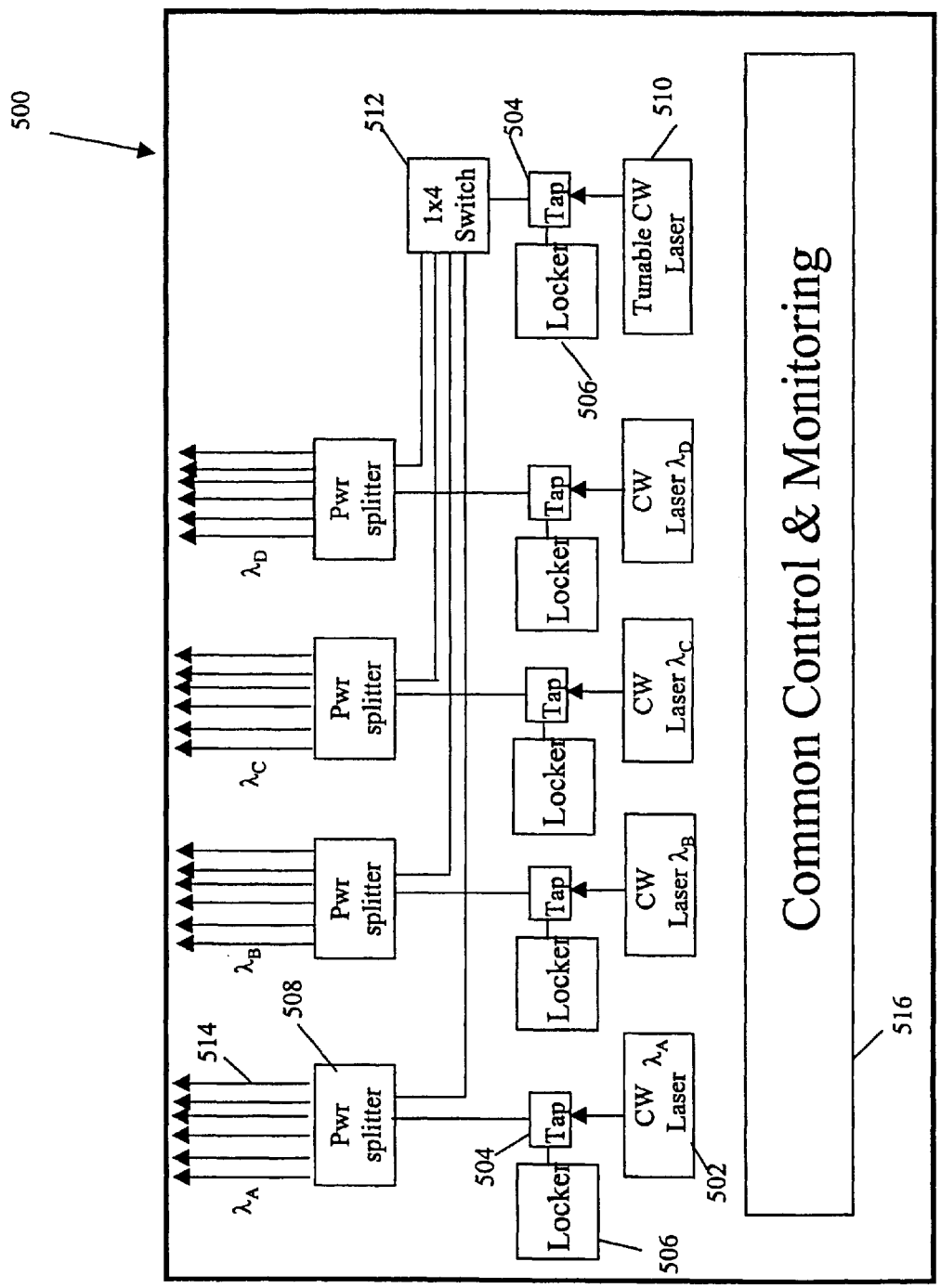
FIG. 5 shows a shared DWDM laser bank, according to an embodiment of the present invention.

An embodiment of a shared Dense Wavelength Divison Multiplex (DWDM) laser bank 500 is shown in FIG. 5. A set of CW lasers 502, each with its own respective wavelength $\lambda_A$, $\lambda_B$, $\lambda_C$, $\lambda_D$, each with a tap 504 and a locker 506 that effects frequency stability through a feedback loop, provides input to a set of power splitters 508, each of which splits its input beam into several output beams. As each laser provides carrier beams for a plurality of output lines, the total number of output lines is greater than the number of lasers in the laser bank. A tunable CW laser 510 that has a tap 504 and a locker 506, feeds a 1×4 switch 512, serves as a redundant laser, providing an alternate input to the power splitters 508 in the event of a fixed CW laser failure. The tunable CW laser 510 can be tuned to the wavelength output of the failed laser, and by choosing the appropriate route through the use of the 1×4 switch 512, the tunable CW laser 510 provides an alternate laser carrier beam to the respective modulator.

Outputs 514 provide carrier beams to, e.g., the optical modulators 416 of FIG. 4. Control and monitoring circuitry 516 is common to all lasers within the shared laser bank 500. In the embodiment illustrated in FIG. 5, a total of 5 lasers (four fixed wavelength CW lasers 502, and one tunable CW laser 510) provides carrier beams to 24 outputs.

Figure 6:
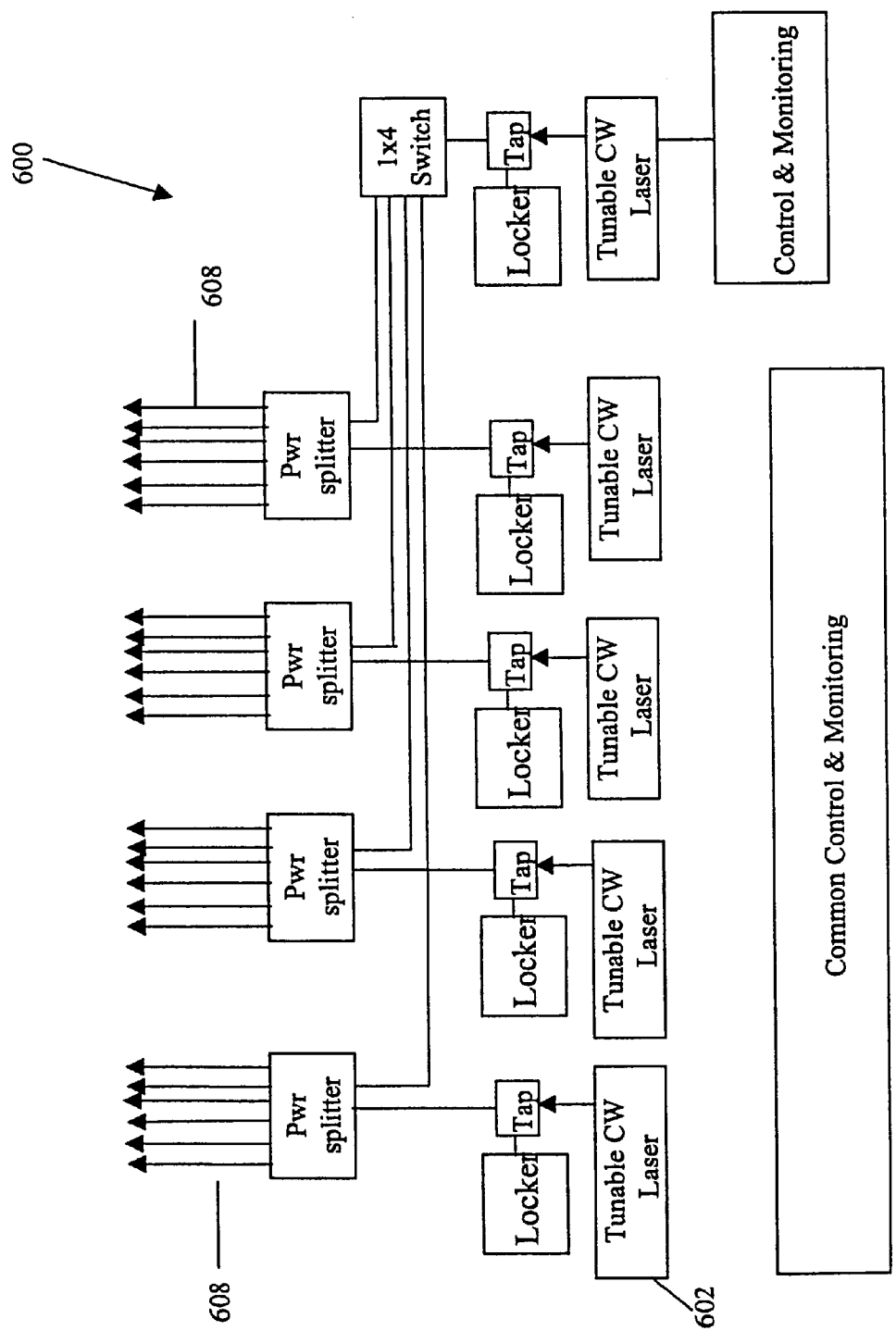
FIG. 6 shows a shared DWDM laser bank with multiple tunable CW lasers, according to an embodiment of the present invention.

FIG. 6 shows another embodiment 600 of a DWDM laser bank. Each of the lasers 602 is a tunable CW laser, which allows for flexibility in the wavelengths of the output carrier beams directed to outputs 608.

Figure 7:
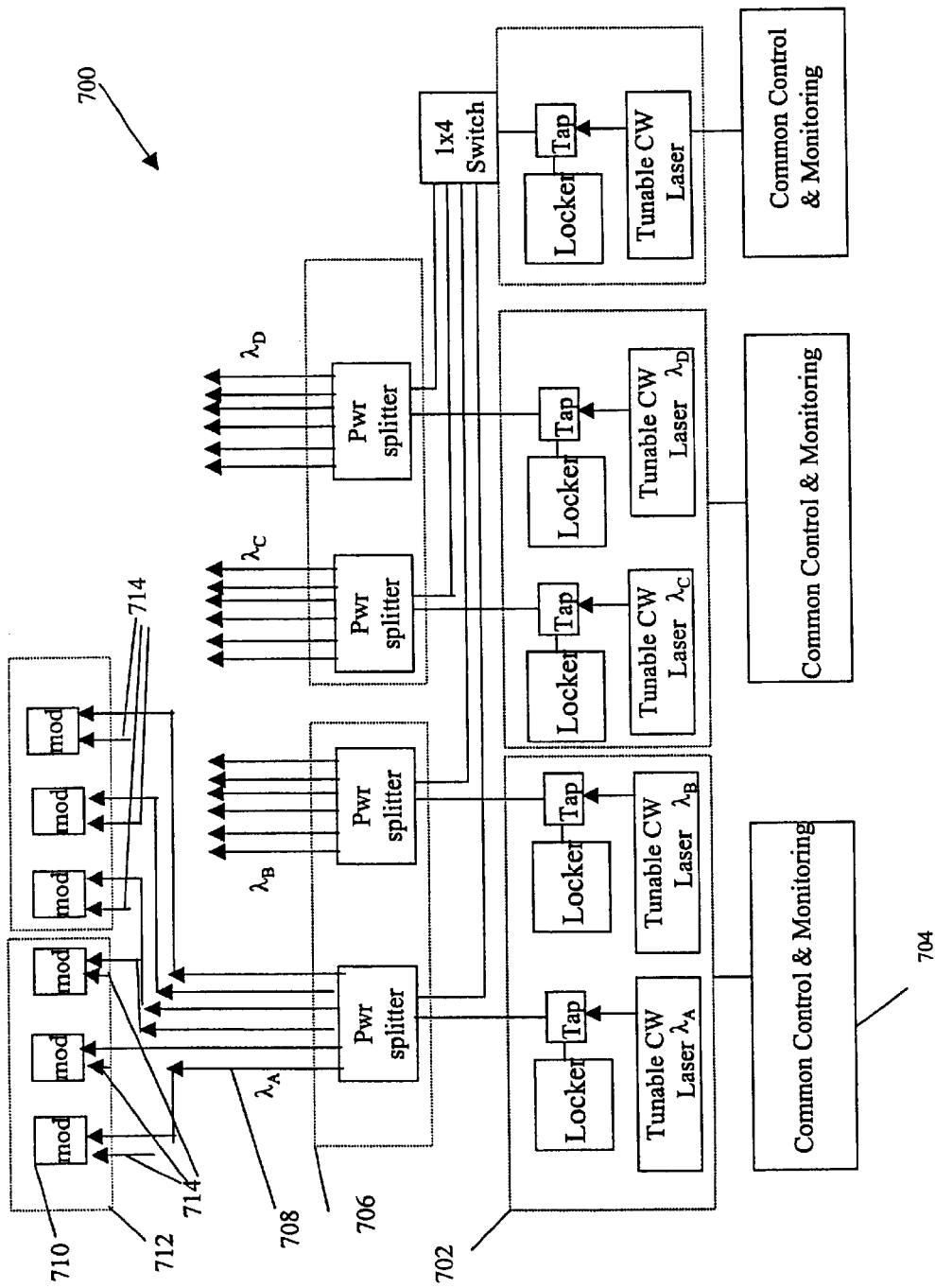
FIG. 7 shows a shared DWDM laser bank, with common control and monitoring for subgroups of lasers, power splitters grouped into subgroups, and modulators grouped into modular sub-units, according to an embodiment of the present invention.
Figure 11:
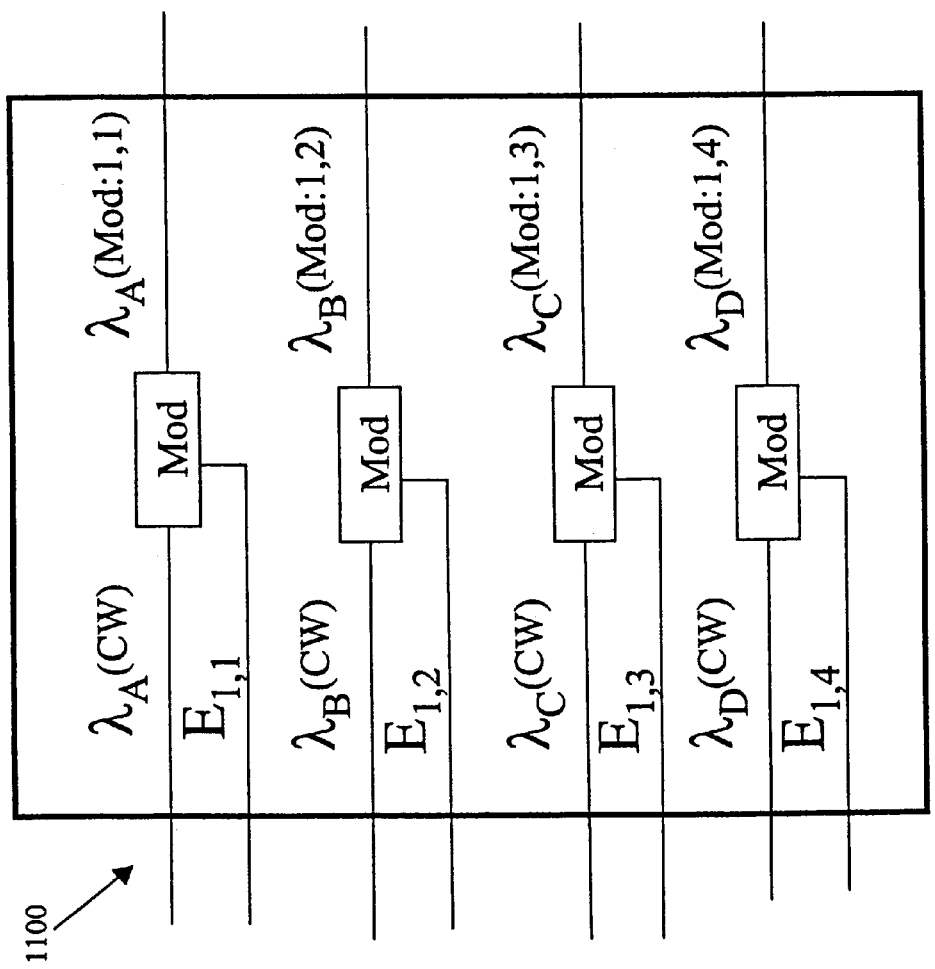
FIG. 11 shows a plurality of optical modulators grouped into a modular unit, according to one embodiment of the present invention.

FIG. 7 shows a Shared DWDM Laser Bank 700 wherein control and monitoring circuitry 704 is common to a subset 702, also called module, of the shared laser bank. Several modules of control and/or monitoring circuitry 704 can then control and/or monitor various groups of lasers, producing different inputs for different subgroups of splitters 706, and hence different outputs for each of the subsets of outputs leaving the splitters 706. External modulators 710 can be grouped as a module 712 within the same physical structure, allowing for more efficient manufacture and ease of replacement. Each modulator receives at least one electrical signal 714, and at least one optical carrier 708. Modular grouping 1100 of modulators allowing for more efficient manufacture and ease of replacement, is shown in detail in FIG. 11.

Figure 8:
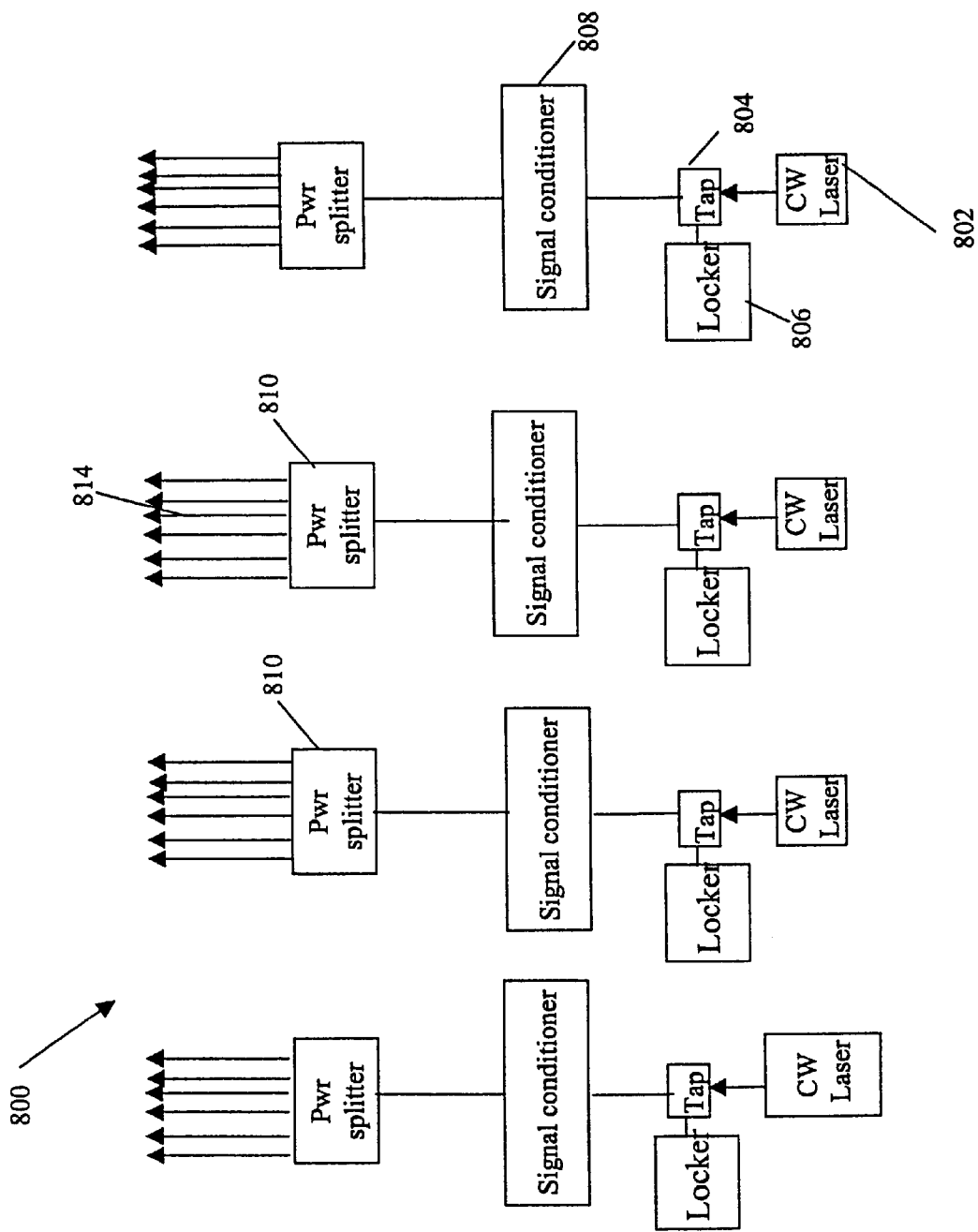
FIG. 8 shows a shared DWDM laser bank with optical signal conditioners, according to an embodiment of the present invention.

FIG. 8 shows another embodiment 800 of a shared DWDM laser bank, this embodiment featuring optical signal conditioning. A CW laser 802, with a tap 804 and a locker 806, feeds an optical signal into a signal conditioner 808. The signal conditioner 808 shapes the optical signal in a pre-determined fashion, controllable through control circuitry (not shown) that may be common to a plurality of signal conditioners 808, and monitored by monitoring circuitry (not shown) that may be common to a plurality of signal conditioners 808; alternatively each signal conditioner may have its own control and monitoring circuitry. The output of each signal conditioner is fed into a power splitter 810, and outputs 814 provide carrier signals for, e.g., optical modulators such as 416 in FIG. 4. In one implementation of this embodiment, each of the signal conditioners 808 may condition its input signal differently, and so provide carrier signals that are unique to the optical modulators which they respectively feed.

Figure 9:
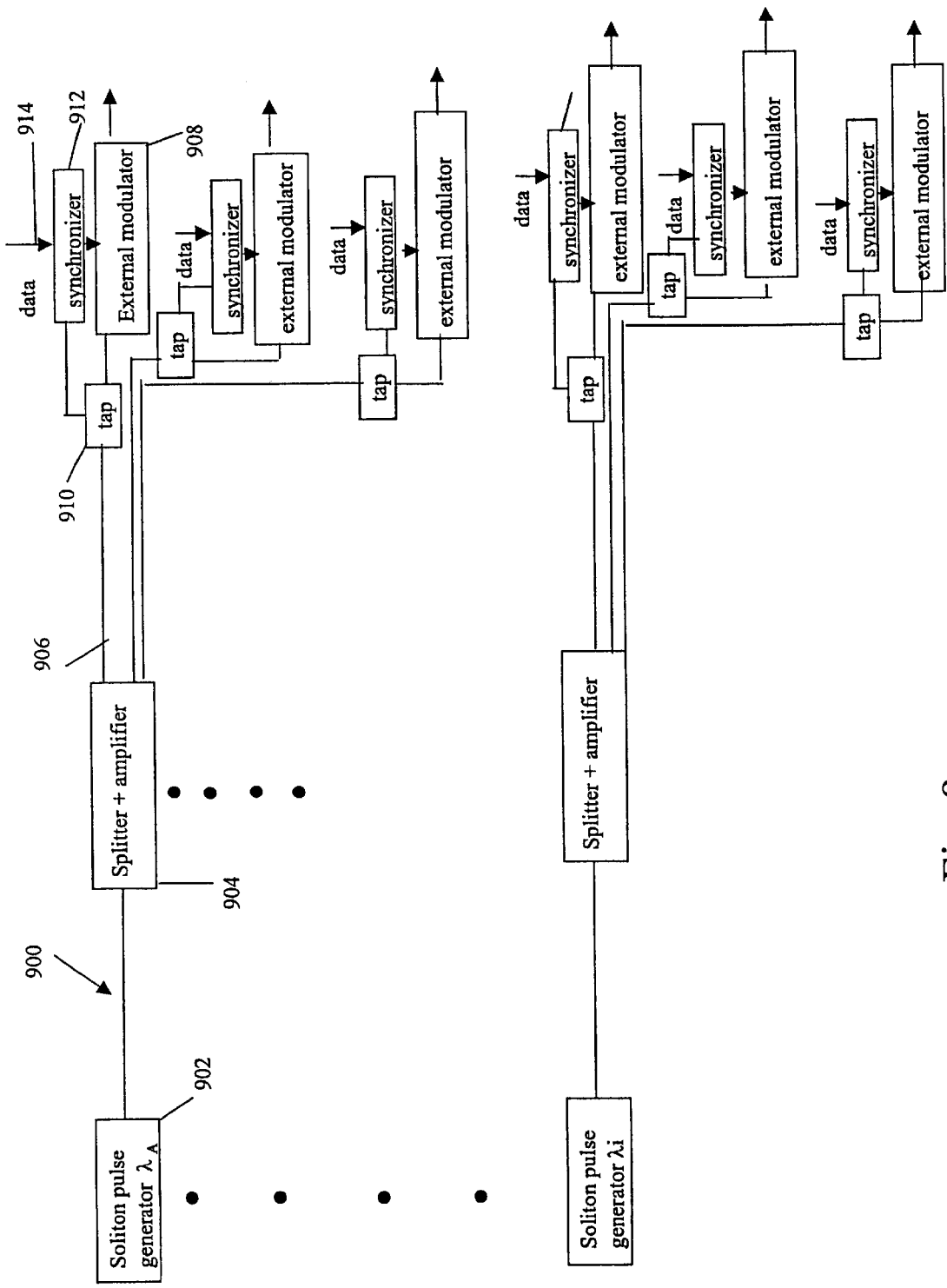
FIG. 9 shows a shared DWDM laser bank with soliton generators, according to an embodiment of the present invention.

Use of solitons in optical networks reduces or eliminates the need for chromatic dispersion compensators, and thus enables interfacing directly into an ultra-long-haul network. FIG. 9. shows yet another embodiment 900 of a shared DWDM laser bank. In this embodiment, carrier signals are generated by a set of soliton pulse generators 902, each with a different characteristic wavelength of light $\lambda_A$, $\lambda_B$, $\lambda_C$, . . . $\lambda_i$. Soliton pulses are usually produced at a fixed rate, the rate being typically 10 Gigabits per second (Gbps). The output of a soliton pulse generator 902 is fed into a splitter 904, usually containing an amplifier. Each of the outputs of the splitter 904 is typically fed into an external optical modulator 908, and a portion of the signal via a tap 910 is fed to a synchronizer 912, which synchronizes the rate of data stream 914 coming from the switching fabric, typically synchronized to the soliton pulse rate of the soliton pulses entering the external optical modulator 908. The modulator 908 either passes or blocks each pulse according to the data stream 914 supplied by the synchronizer 912, thus forming the desired information bit stream that is sent onto the output optical transmission line (not shown).

Figure 10:
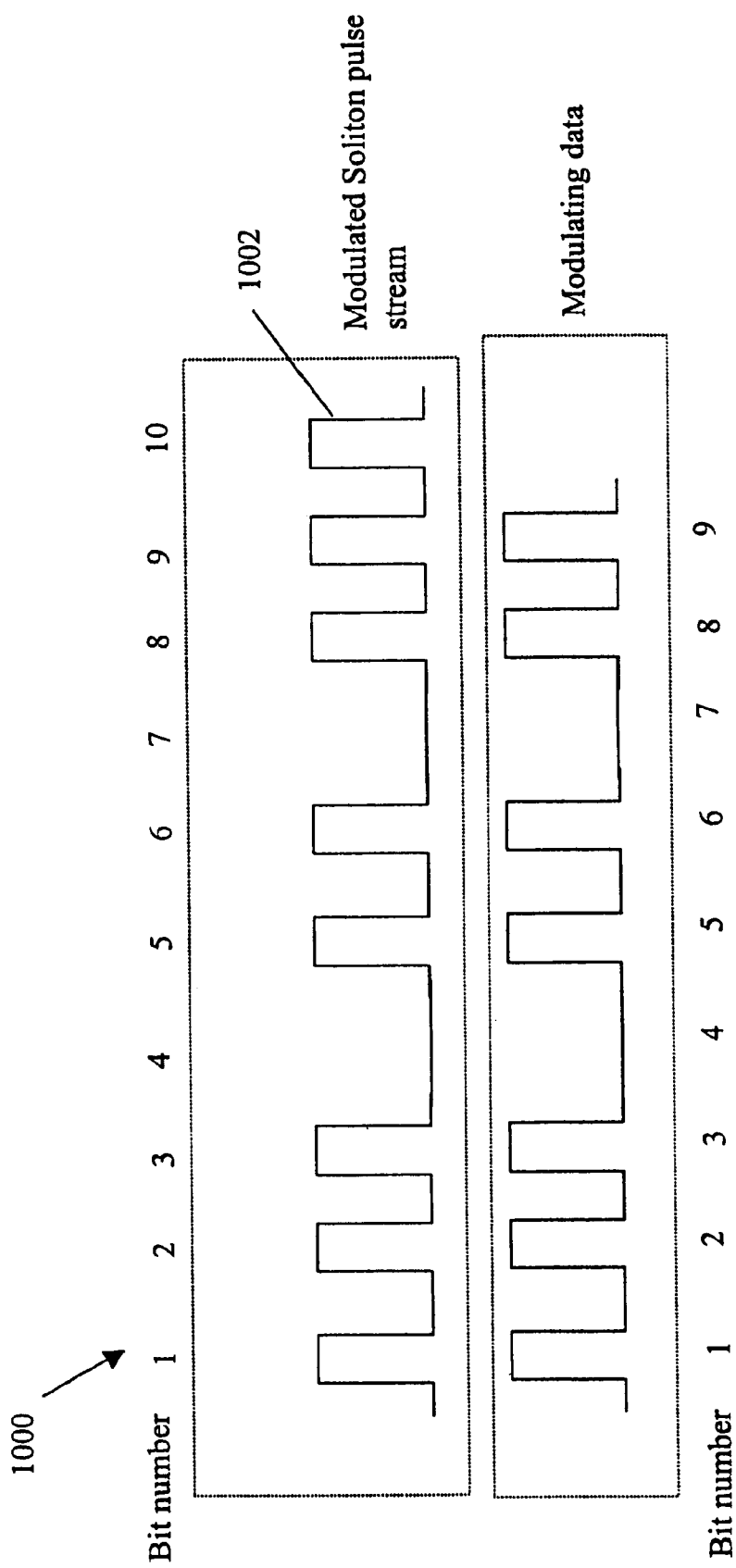
FIG. 10 depicts modulating data which is input to an optical modulator that modulates soliton pulses, and the soliton pulse output, which includes a parity bit, according to one embodiment of the present invention.

The data rate may be synchronized to exactly match that of the soliton pulse rate. Alternatively, the data rate may be synchronized according to a scheme 1000 such as shown in FIG. 10, wherein every $10^{th}$ soliton signal 1002 is modulated by a sum bit of the previous nine data bits, thus providing a check sum as an error correction mechanism. In similar fashion, data encoding of soliton pulses may be set forth according to any scheme, e.g., one-to-one correspondence with data rate, offset by one check-sum bit, offset by several error correction bits, aperiodic, etc.

Figure 12:
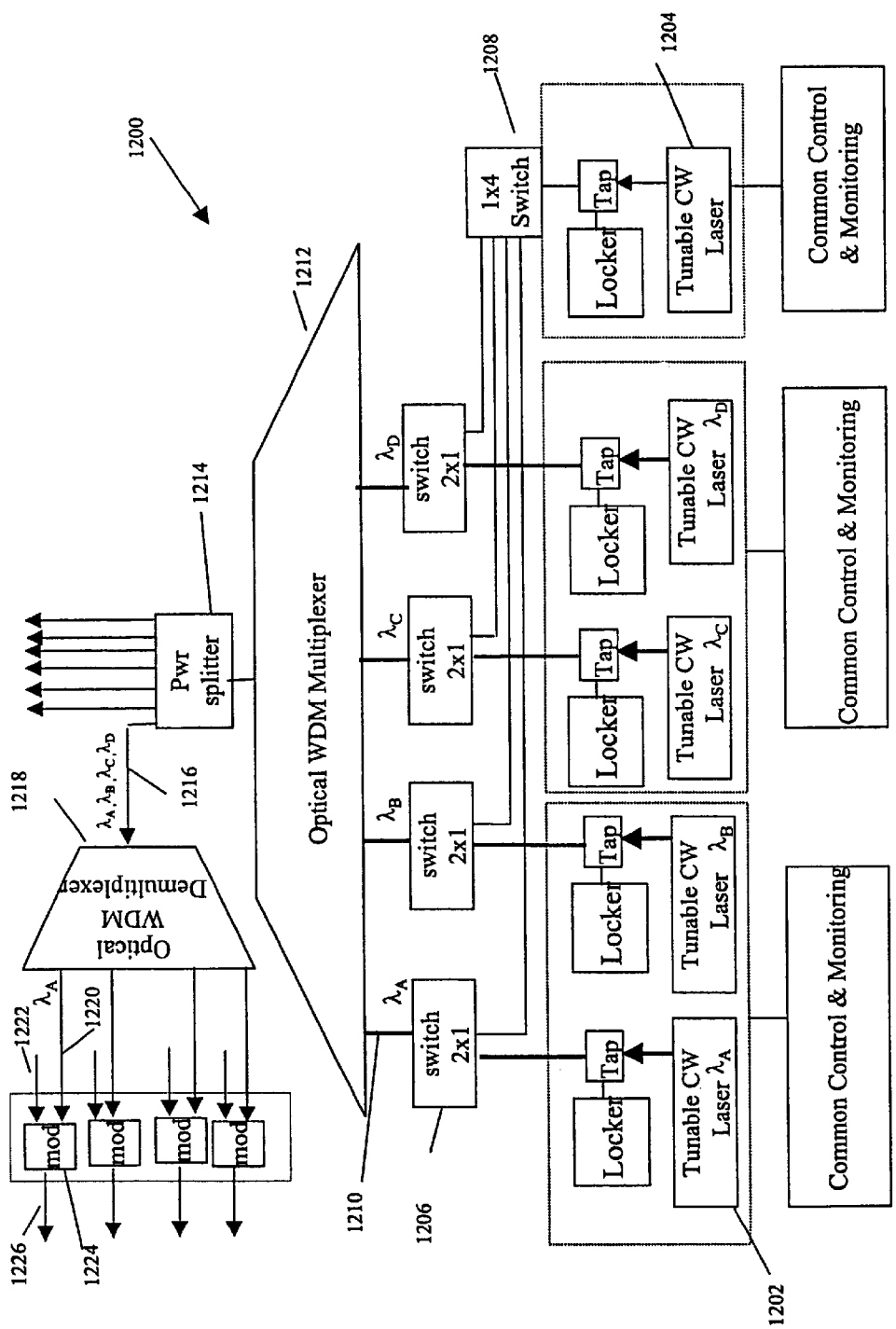
FIG. 12 shows a shared laser bank whose wavelengths are multiplexed, split into a set of multiplexed beams, and subsequently de-multiplexed and modulated, according to an embodiment of the invention.

In all of the embodiments described thus far, distributing of optical carrier beams is accomplished through splitting of an optical beam. It is appreciated by those of ordinary skill that other techniques may be employed to distribute an optical beam, e.g. in the case of an optical beam comprising a plurality of optical beams which may be of differing wavelengths that may be multiplexed onto a trunk line, the distribution may be accomplished using, e.g., one or more distribution devices including, but not limited to optical add/drop elements, add/drop multiplexers, wavelength routers, wavelength filters, circulators and combinations thereof. An illustration is shown in FIG. 12. Here a laser 1202 produces a carrier beam of wavelength $\lambda_A$, which then passes through a 2×1 switch 1206, enabling redundancy provided by a tunable CW laser 1204 and a 1×4 switch 1208. A laser carrier beam 1210 of wavelength $\lambda_A$ then feeds into an optical Wavelength Division Multiplexing (WDM) multiplexer 1212, where it is multiplexed with other laser carrier beams, here $\lambda_B$, $\lambda_C$, $\lambda_D$. The multiplexed beam is then fed to a beam splitter 1214, splitting the multiplexed beam into a plurality of daughter multiplexed beams, each containing wavelengths $\lambda_A$, $\lambda_B$, $\lambda_C$, and $\lambda_D$. A daughter multiplexed beam 1216 feeds into a WDM de-multiplexer, where the multiplexed beam 1216 is distributed to form a plurality of laser carrier beams of single wavelength $\lambda_A$, $\lambda_B$, $\lambda_C$, and $\lambda_D$, respectively. A laser carrier beam 1220 of wavelength $\lambda_A$ then feeds into an optical modulator 1224, where it is modulated by information on an information channel 1222. The modulated laser beam 1226 is then output for transmission.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. I therefore claim as my invention all such embodiments that come within the scope and spirit of these claims.

I claim:

1. A method comprising:
   receiving information at each of a plurality of optical modulators from at least one of a plurality of information channels;
   generating at least one laser carrier beam from a laser bank comprising at least one laser;
   distributing the at least one laser carrier beam to form a plurality of distributed laser carrier beams;
   receiving at least one distributed laser carrier beam at each of the plurality of optical modulators;
   modulating, in at least one optical modulator, the at least one distributed carrier beam with the received information.

2. The method of claim 1 wherein distributing comprises splitting the at least one laser carrier beam to form a plurality of distributed laser carrier beams.

3. The method of claim 1 wherein the at least one laser carrier beam comprises a plurality of wavelengths.

4. The method of claim 3 wherein distributing comprises separating wavelengths to form a plurality of distributed laser carrier beams, each of which comprises essentially one wavelength.

5. The method of claim 1, wherein the laser bank comprises a plurality of lasers.

6. The method of claim 5, wherein the laser bank further comprises control circuitry that is shared among a plurality of lasers within the laser bank.

7. The method of claim 5, wherein the laser bank further comprises monitoring circuitry that is shared among a plurality of lasers within the laser bank.

8. The method of claim 5 wherein at least one laser emits a wavelength that is unequal to the wavelengths emitted by other lasers comprising the laser bank.

9. The method of claim 1, wherein transmission occurs over fiber optic lines.

10. The method of claim 1, wherein a plurality of optical modulators is integrated into a module.

11. The method of claim 1, wherein at least one of the channels of information is redundant.

12. The method of claim 1, further comprising conditioning at least one laser carrier beam with a signal conditioner prior to distributing.

13. The method of claim 12 wherein conditioning comprises generating soliton pulses.

14. The method of claim 13 wherein the generated soliton pulses are modulated by an optical modulator that is synchronized to the soliton pulse stream rate.

15. The method of claim 14 wherein the soliton pulses are modulated to include at least one parity bit.

16. The method of claim 1, wherein the information from one channel of information is input to a plurality of optical modulators.

17. An apparatus comprising:
   at least one channel of information;
   at least one switching fabric;
   a laser bank comprising at least one laser;
   at least one distributor, that distributes a laser carrier beam from the laser bank to form a plurality of distributed laser carrier beams, wherein the number of distributed laser carrier beams is greater than the number of lasers in the laser bank;
   a plurality of optical modulators, each of which receives at least one distributed laser carrier beam, and at least one channel of information.

18. The apparatus of claim 17, wherein at least one optical modulator modulates at least one distributed laser carrier beam with information from at least one channel of information.

19. The apparatus of claim 17, wherein the laser bank further comprises a plurality of lasers, and control circuitry which is shared among a plurality of lasers within the laser bank.

20. The apparatus of claim 17, wherein the laser bank further comprises a plurality of lasers, and monitoring circuitry which is shared among a plurality of lasers within the laser bank.

21. The apparatus of claim 17, wherein transmission of information occurs over fiber optic lines.

22. The apparatus of claim 17, wherein a plurality of optical modulators is integrated into a modular unit.

23. The apparatus of claim 17, wherein at least one of the channels of information is redundant.

24. The apparatus of claim 17, further comprising at least one signal conditioner coupled to the output of at least one laser, prior to distributing.

25. The apparatus of claim 24, wherein the at least one signal conditioner produces a laser carrier beam that is distinguishable from another laser carrier beam.

26. The apparatus of claim 24 wherein the signal conditioner generates soliton pulses.

27. The apparatus of claim 26 wherein the soliton pulses are subsequently modulated by an optical modulator that is synchronized to the soliton pulses.

28. The apparatus of claim 26 wherein wherein the information that modulates the soliton pulses includes a periodic error correction bit.

29. The apparatus of claim 17, wherein at least one of the lasers in the laser bank is a tunable continuous wave laser.

30. The apparatus of claim 17, wherein at least one of the lasers in the laser bank is redundant to at least one of the other lasers in the laser bank.

31. The apparatus of claim 17, wherein at least one laser is redundant to all of the other lasers in the laser bank.

32. The apparatus of claim 31 wherein the at least one laser that is redundant is a tunable continuous wave laser.

33. An apparatus comprising:
   a means for receiving information at each of a plurality of optical modulators;
   a means for generating at least one laser carrier beam from a laser bank comprising at least one laser;
   a means for distributing the at least one laser carrier beam, to form a plurality of distributed laser carrier beams that is greater in number than the number of lasers comprising the laser bank;
   a means for receiving at least one distributed laser carrier beam at each of the plurality of optical modulators;
   a means for modulating, in at least one optical modulator, the at least one distributed laser carrier beam, with the received information.

34. An apparatus comprising:
   a soliton generator, generating at least one soliton pulse train;
   a distributor that receives a soliton pulse train and distributes the soliton pulse train, to form a plurality of distributed soliton pulse trains;
   a plurality of data synchronizers;
   a plurality of data inputs, each of which feeds data into at least one data synchronizer;
   a plurality of modulators, which is greater in number than the number of soliton pulse generators, each modulator coupled to at least one data synchronizer, each modulator receiving at least one distributed soliton pulse train and modulating the at least one distributed soliton pulse train with data from at least one data synchronizer.

35. A method comprising:
   receiving input data from at least one data channel;
   generating at least one soliton pulse train from at least one soliton pulse generator;
   distributing the at least one soliton pulse train, to form a plurality of distributed soliton pulse trains;
   modulating at least one distributed soliton pulse train with the received input data.

36. The method of claim 5, wherein at least one of the lasers is redundant to all of the other lasers.

37. The method of claim 36, wherein the at least one laser that is redundant is a tunable continuous wave laser.

* * * * *